US00RE42173E

(19) United States
(12) Reissued Patent
Suthmann

(10) Patent Number: US RE42,173 E
(45) Date of Reissued Patent: Mar. 1, 2011

(54) COMPRESSOR UNIT

(75) Inventor: Michael Suthmann, Kranzberg (DE)

(73) Assignee: KAESER Kompressoren GmbH, Coburg (DE)

(21) Appl. No.: 29/300,394

(22) Filed: Mar. 20, 2008

Related U.S. Patent Documents

Reissue of:
(64) Patent No.: Des. 552,626
Issued: Oct. 9, 2007
Appl. No.: 29/265,259
Filed: Aug. 29, 2006

(30) Foreign Application Priority Data

Mar. 1, 2006 (EM) ..... 487400

(51) LOC (9) Cl. ..... 15-02
(52) U.S. Cl. ..... D15/9
(58) Field of Classification Search ..... D15/7–9; D23/231, 232, 225; 417/60, 235, 265, 321, 417/355, 358, 363, 359, 410.1, 415–416, 417/405, 360
See application file for complete search history.

(56) References Cited

U.S. PATENT DOCUMENTS 4,722,673 A 2/1988 Grime et al.
D423,518 S 4/2000 Milligan et al.
D446,793 S 8/2001 Matthew et al.
D497,369 S * 10/2004 Govier et al. ..... D15/9
D550,721 S * 9/2007 Tanaka et al. ..... D15/9

* cited by examiner

*Primary Examiner*—R. Seifert
(74) *Attorney, Agent, or Firm*—Jean C. Edwards, Esq.; Akerman Senterfitt

(57) CLAIM

The design for the compressor unit, as shown and described.

DESCRIPTION

FIG. 1 is a perspective view of the front in one embodiment of my new design;
FIG. 2 is a [front] *right side* view thereof;
FIG. 3 is a [rear] *left side* view thereof;
FIG. 4 is a [right side] *front* view thereof;
FIG. 5 is a [left side] *rear* view thereof;
FIG. 6 is a top view thereof; and,
FIG. 7 is a perspective view of the rear thereof.
It being understood that the broken lines are for illustrative purposes only and form no part of the claimed design.

1 Claim, 7 Drawing Sheets

Figure 1:
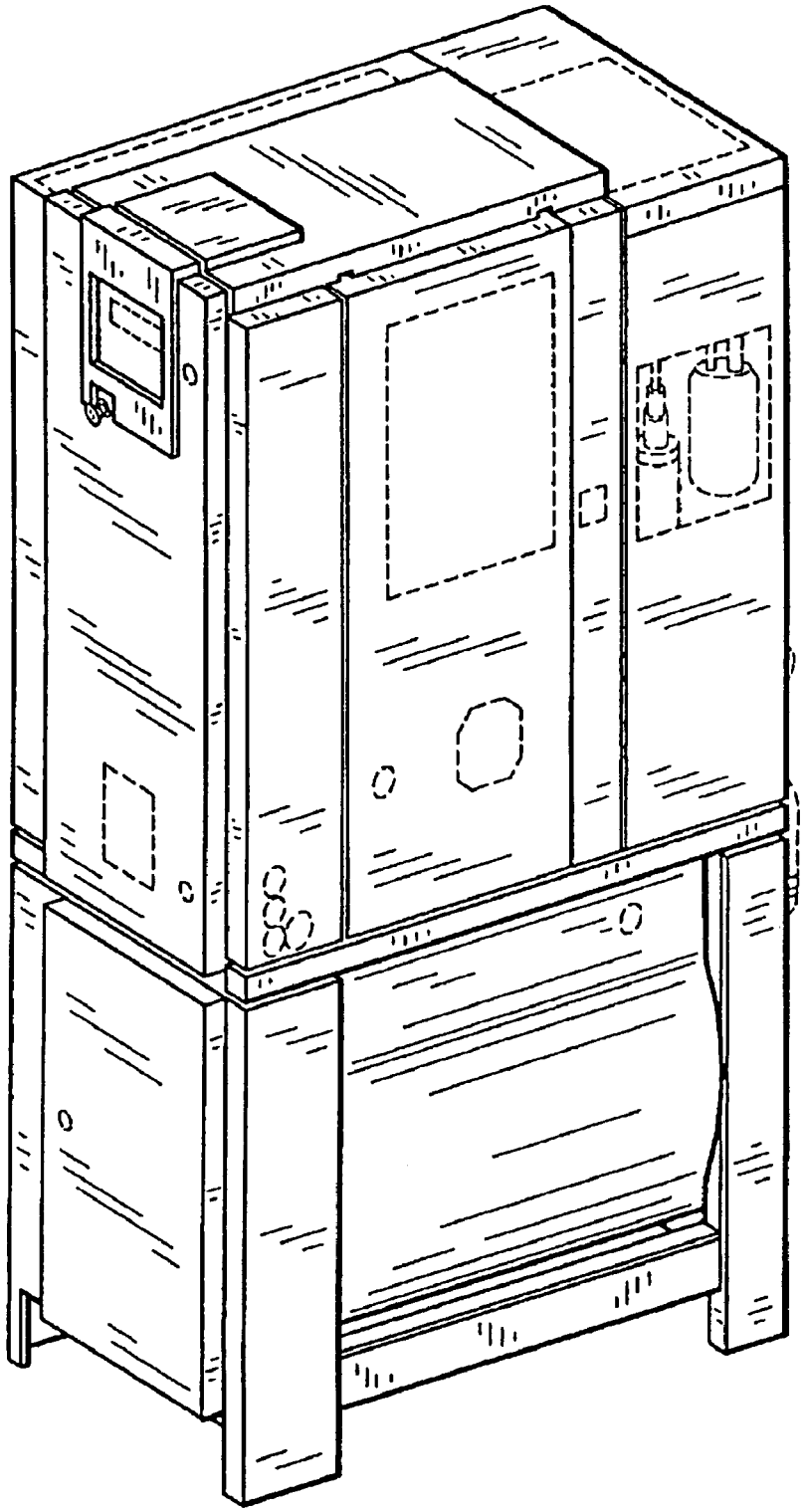
Figure 2:
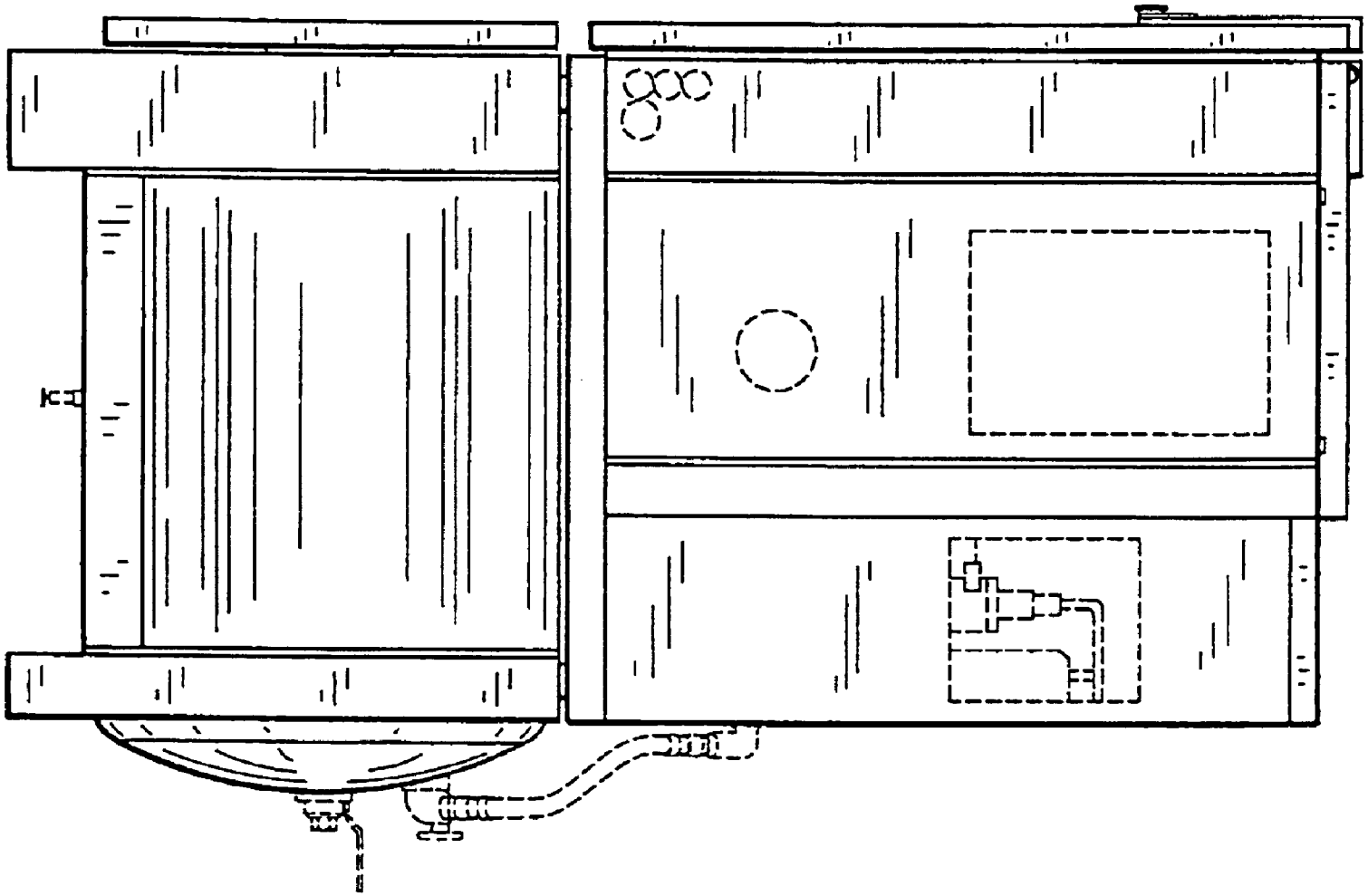
Figure 3:
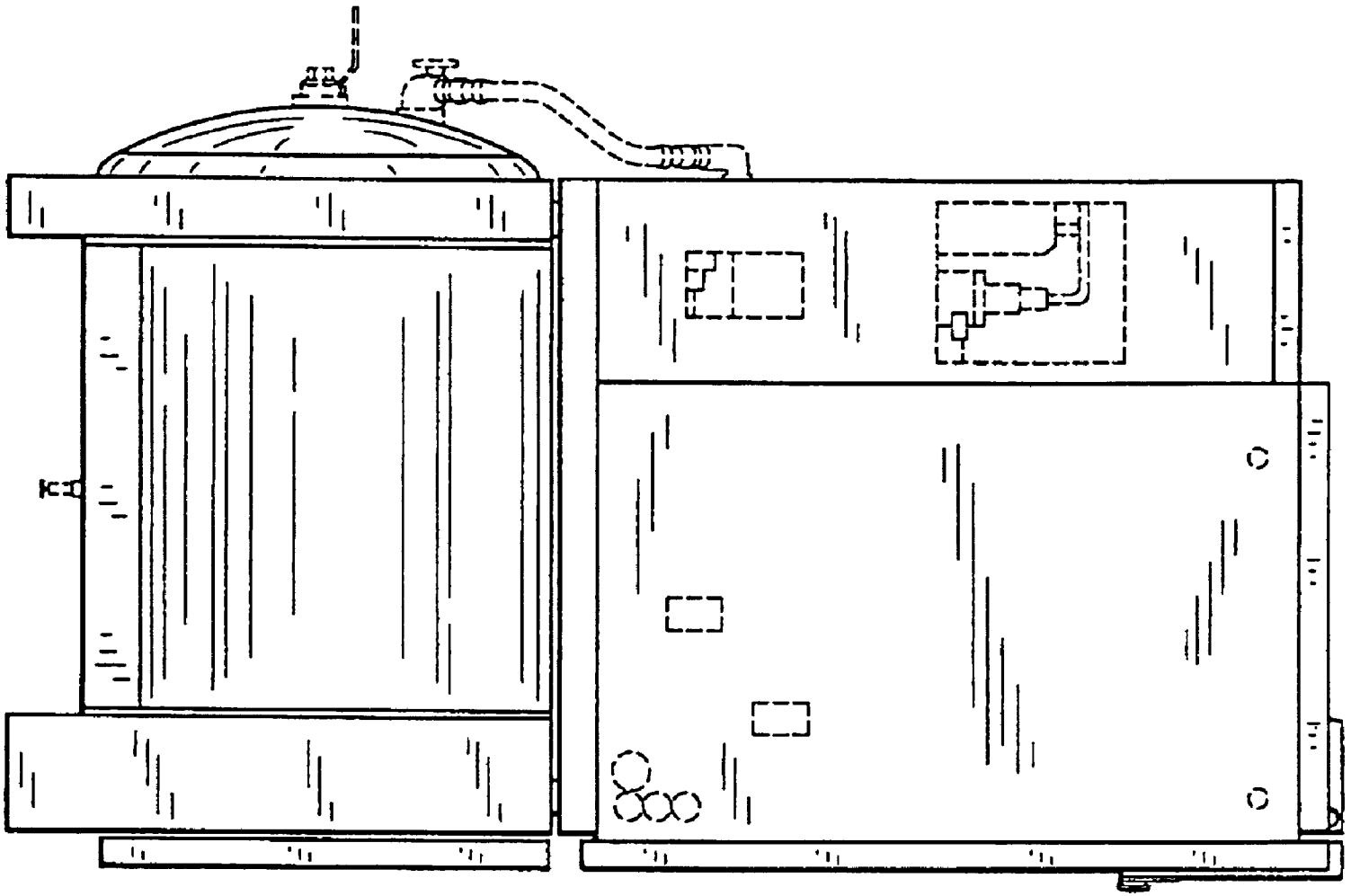
Figure 4:
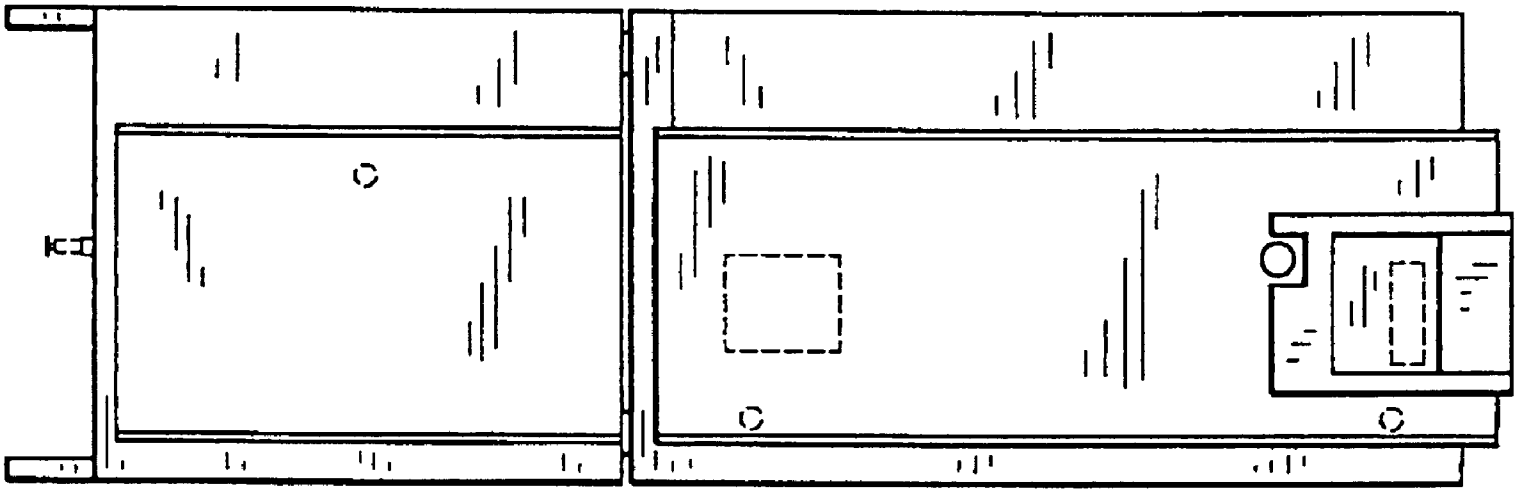
Figure 5:
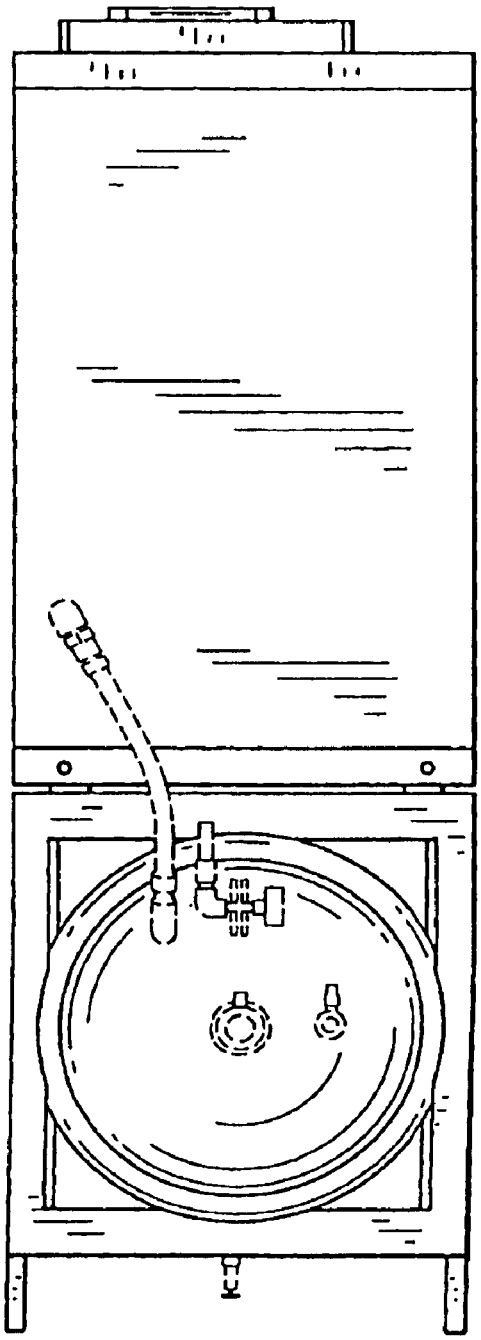
Figure 6:
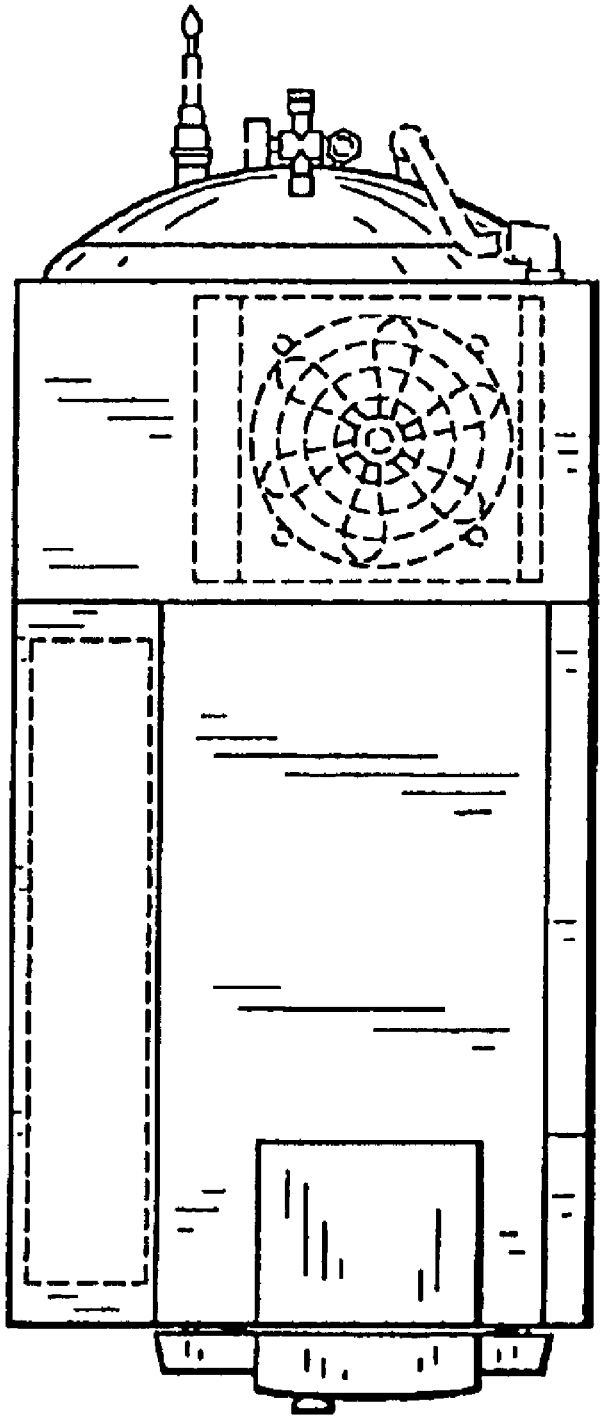
Figure 7:
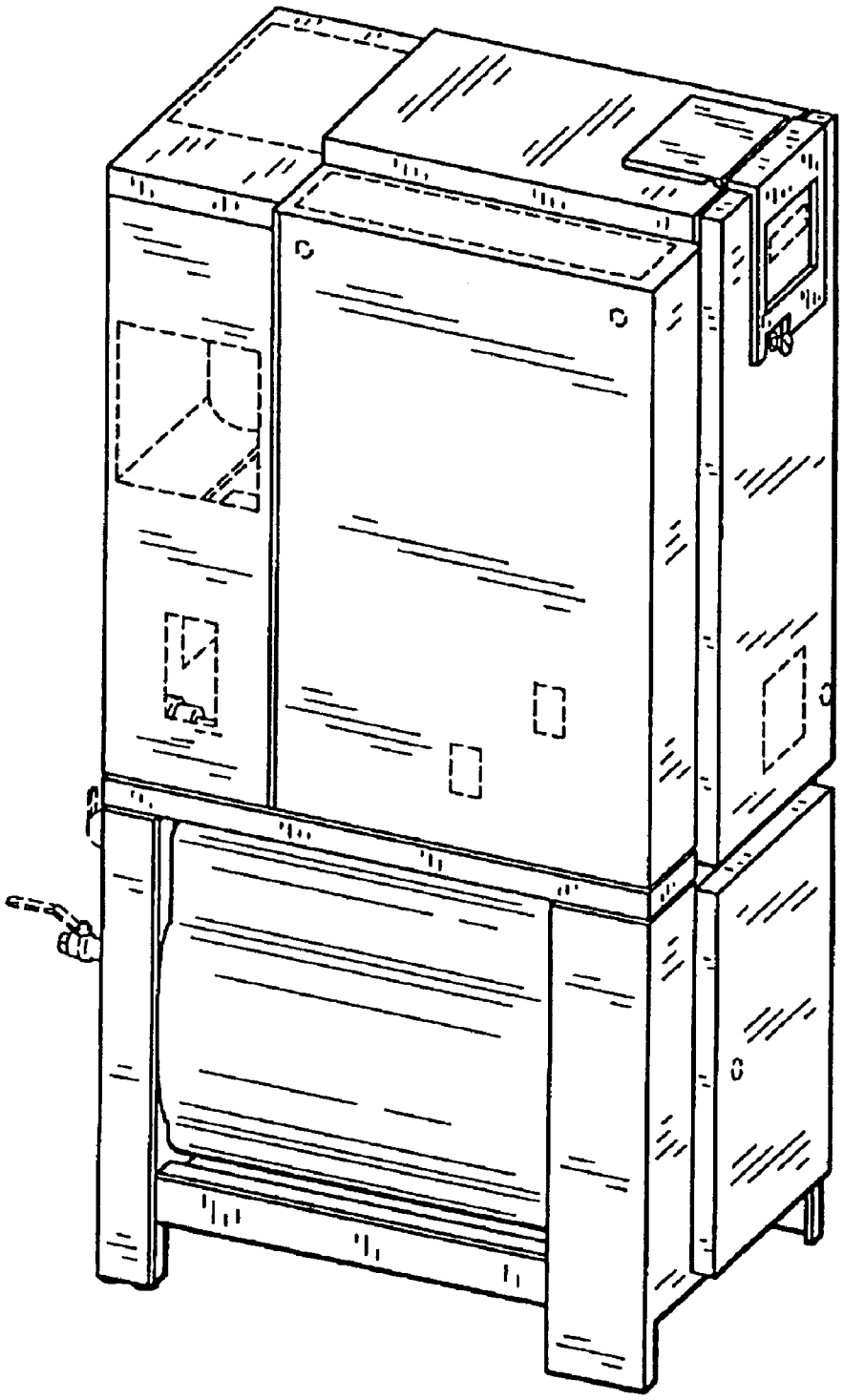

Matter enclosed in heavy brackets [ ] appears in the original patent, but forms no part of this reissue; matter printed in italics indicates the additions made by reissue.

AMENDED